EDWARD GALLAGHER, OF LOCK HAVEN, PENNSYLVANIA.

COMPOSITION FOR ARTIFICIAL STONE.

SPECIFICATION forming part of Letters Patent No. 457,953, dated August 18, 1891.

Application filed April 8, 1891. Serial No. 388,170. (No specimens.)

*To all whom it may concern:*

Be it known that I, EDWARD GALLAGHER, a citizen of the United States, and a resident of Lock Haven, in the county of Clinton and State of Pennsylvania, have invented certain new and useful Improvements in Artificial Stone; and I do hereby declare that the following is a full, clear, and exact description of the invention, which will enable others skilled in the art to which it appertains to make and use the same.

This invention relates to compositions for artificial stone and manufactured articles (such as building-blocks, flag-stones, columns, and the like) from such material; and it consists in the peculiar compound or composition which will be hereinafter more fully described and claimed.

To prepare this material I mix the following ingredients in about the proportions set opposite to each, to wit: Portland cement, fifty pounds; clean, coarse, and sharp sand, fifty pounds; plaster-of-paris, five pounds; powdered soapstone, one pound; salt, one pound. These ingredients are first mixed thoroughly in a dry state, after which I add by degrees and while stirring the mixture briskly from seven to ten gallons of lime-water prepared by slaking ten pounds of lime in ten gallons of water. This forms a smooth and glossy paste, which is then ready to be poured into molds of suitable size and shape, when the composition is allowed to set and harden. When sufficiently hard, the article is removed from the mold and is then ready for use.

In its natural state the stone formed from this composition is an excellent imitation of granite, both as to color, texture, and hardness; but, if desired, the composition may be colored by the addition of any suitable mineral pigments, either by adding the same to the dry ingredients before mixing with the lime-water or by dissolving the pigments in the lime-water before adding them to the dry ingredients.

This composition is adapted for use in the manufacture of all articles which can be made from artificial stone, such as building-blocks, columns, and carved capitals for the same, ornamental window-sills and facings, copings, tiles, and many other objects too numerous to mention. It will be found equally well adapted to the laying of floors and sidewalks in a plastic state, and resists the action of frost better than any other artificial stone pavement with which I am acquainted. The mixing of the lime with the dry ingredients in the form of lime-water is of importance, as it is productive of better results than can be attained by adding the lime in a dry state and then mixing with water. Experiments have abundantly demonstrated that artificial stone prepared according to my invention possesses a degree of hardness and smoothness of texture which adapts it for all uses where natural stone has heretofore been employed, while it may be produced in suitable shapes at a greatly-reduced cost.

I am aware that several of the ingredients employed by me have been used before in different combinations; but I am not aware that these ingredients have been used before in the specific combination and in about the proportions hereinbefore set forth.

What I claim, therefore, and desire to secure by Letters Patent of the United States, is—

The described composition for artificial stone, consisting of cement, sand, plaster-of-paris, powdered soapstone, and salt mixed in a dry state in about the proportions set forth and then rendered plastic by the admixture of lime-water, substantially in the proportion and manner hereinbefore set forth.

In testimony that I claim the foregoing as my own I have hereunto affixed my signature in presence of two witnesses.

EDWARD GALLAGHER.

Witnesses:
J. IRWIN HAGERMAN,
FRANK MCMAHAN.